(12) United States Patent
Ellner et al.

(10) Patent No.: US 9,602,918 B2
(45) Date of Patent: Mar. 21, 2017

(54) STREAM CACHING FOR AUDIO MIXERS

(71) Applicant: GOOGLE INC., Mountain View, CA (US)

(72) Inventors: Lars Henrik Ellner, Mountain View, CA (US); Turaj Zakizadeh Shabestary, Mountain View, CA (US); Niklas Enbom, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 532 days.

(21) Appl. No.: 13/780,728

(22) Filed: Feb. 28, 2013

(65) Prior Publication Data

US 2015/0201274 A1 Jul. 16, 2015

(51) Int. Cl.
*H04R 5/00* (2006.01)
*H04R 3/00* (2006.01)
*G10L 19/008* (2013.01)
*H04M 1/60* (2006.01)
*G10L 25/78* (2013.01)

(52) U.S. Cl.
CPC .............. *H04R 3/00* (2013.01); *G10L 19/008* (2013.01); *G10L 25/78* (2013.01); *H04M 1/60* (2013.01); *H04R 2499/11* (2013.01)

(58) Field of Classification Search
CPC ........ H04R 3/00; H04M 3/567; H04M 3/568; H04M 2207/35; H04M 7/009; H04M 7/1225; H04M 7/006; H04M 11/007; H04M 2203/6081; H04M 2203/5063; H04M 3/42314; H04M 3/56; H04M 3/569; H04M 7/00; H04H 20/423
USPC ............. 381/80, 56–58, 17–23, 119; 700/94; 704/204, 205, 226, 227; 370/260, 266; 455/426.1
See application file for complete search history.

(56) References Cited

U.S. PATENT DOCUMENTS

| | | | |
|---|---|---|---|
| 4,449,238 A | 5/1984 | Lee et al. | |
| 5,848,146 A | 12/1998 | Slattery | |
| 6,850,496 B1 * | 2/2005 | Knappe et al. | ............... 370/260 |
| 7,783,063 B2 | 8/2010 | Pocino et al. | |
| 8,340,269 B2 | 12/2012 | Yue | |
| 8,559,646 B2 * | 10/2013 | Gardner | ........................ 381/63 |
| 8,868,415 B1 * | 10/2014 | Rai et al. | ...................... 704/226 |

FOREIGN PATENT DOCUMENTS

WO   WO 2010/075790   *   7/2010 .............. H04M 3/56

* cited by examiner

*Primary Examiner* — Lun-See Lao
(74) *Attorney, Agent, or Firm* — Birch, Stewart, Kolasch & Birch, LLP (57) ABSTRACT

Methods and systems are provided for reusing audio streams in an audio mixing environment such that processing resources are not wasted on encoding the same audio streams multiple times. Instead, processing resources are conserved without comprising audio quality. The methods described herein are particularly useful when a participant transitions from using a shared encoder to using the participant's own encoder, and when the participant transitions from using the participant's own encoder to using a shared encoder.

14 Claims, 4 Drawing Sheets

STREAM CACHING FOR AUDIO MIXERS

TECHNICAL FIELD

The present disclosure generally relates to systems and methods for mixing audio signals. More specifically, aspects of the present disclosure relate to caching audio streams to send to clients when using shared audio encoders.

BACKGROUND

In the context of an audio conference, an audio mixer receives audio streams from most or all of the conference participants and sends back to the participants some combination of the received audio streams. For example, the audio mixer may send back a combination of the streams containing audio (e.g., voice) of those participants who are actually talking. If the audio mixer is sending audio streams which, when decoded, should sound the same for multiple participants, then where the participants are receiving streams encoded with the same encoder settings (e.g., same codec type, sampling frequency, etc.), processing resources are wasted to encode the same audio with essentially the same encoder (it should be noted that the modifier "essentially" is used because the codec state may differ for the different streams).

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for sharing encoded audio, the method comprising: encoding, by an audio mixing apparatus, audio signals to send to a first client using a first encoder and audio signals to send to a second client using a second encoder; determining that the first encoder is in a similar state as the second encoder; and in response to determining that the first encoder is in a similar state as the second encoder, the audio mixing apparatus sending the audio signals encoded using the second encoder to the first client and the second client.

In another embodiment, the method for sharing encoded audio further comprises: receiving, at the audio mixing apparatus, audio signals from a plurality of clients in communication with the audio mixing apparatus; performing a mixing algorithm on the received audio signals to generate a plurality of mixed audio signals; and sending each of the plurality of mixed audio signals to one or more of the plurality of clients.

In another embodiment, the method for sharing encoded audio further comprises storing a number of audio frames to bring the first encoder to a similar state as the second encoder.

Another embodiment of the present disclosure relates to a method comprising: encoding, by an audio mixing apparatus, audio signals to send to a first client and a second client using a first encoder; copying an encoder state of the first encoder; updating a second encoder with the copied encoder state of the first encoder; and encoding audio signals to send to the second client using the updated second encoder.

In another embodiment of the method, the step of copying the encoder state of the first encoder includes copying buffered audio for the first encoder to the second encoder.

Yet another embodiment of the present disclosure relates to a method comprising: performing, by an audio mixing apparatus, a mixing algorithm on audio signals received from a plurality of channels to generate mixed audio signals; identifying, from the plurality of channels, a unique channel set and one or more non-unique channel sets, wherein the unique channel set includes channels that each receive a unique one of the mixed audio signals, and wherein the one or more non-unique channel sets each includes channels that receive a non-unique one of the mixed audio signals; determining that in the previous mix cycle a channel in the unique channel set was re-using audio frames encoded by a channel in a non-unique channel set; and copying a codec state of the channel in the non-unique channel set to the channel in the unique channel set that was re-using the audio frames encoded by the channel in the non-unique channel set.

In another embodiment, the method further comprises encoding, for each of the channels in the unique channel set, the unique one of the mixed audio signals corresponding to that channel using an encoder for that channel.

In still another embodiment, the method further comprises identifying, for each of the one or more non-unique channel sets, an encoder used by a channel in the non-unique channel set that was encoding the same non-unique one of the mixed audio signals in the previous mix cycle; and encoding, for each of the one or more non-unique channel sets, a corresponding one of the non-unique mixed audio signals using the identified encoder.

In one or more other embodiments, the methods described herein may optionally include one or more of the following additional features: the mixing algorithm is performed based on voice activity detected in the received audio signals; the determination that the first encoder is in a similar state as the second encoder is based on an absence of audible distortions when encoding and decoding a segment of audio; the first and second clients are participants in an audio conference; the first encoder and the second encoder are synchronized with respect to buffered audio; each of the one or more non-unique channel sets receives a different one of the non-unique mixed audio signals; and/or the channel in the non-unique channel set and the channel in the unique channel set are synchronized with respect to buffered audio.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that the embodiments described herein may be practiced without many of these details. Likewise, one skilled in the relevant art will also understand that the embodiments described herein can include many other obvious features not described in detail herein. Additionally, some well-known structures or functions may not be shown or described in detail below, so as to avoid unnecessarily obscuring the relevant description.

In a scenario involving multiple clients participating in an audio conference session (e.g., an audio conference), some of the clients will receive the same mixed audio for a given mix cycle performed, for example, by an audio mixer being used as part of the conferencing hardware or system. For example, where four clients "A", "B", "C", and "D" are participating in an audio conference (where the audio streams sent by clients A, B, C, and D to the audio mixer are represented as "a", "b", "c" and "d", respectively) and, for a particular mix cycle, the audio of clients A and B is mixed (e.g., audio streams a and b are mixed), then clients C and D, whose audio streams were not included in the mix, receive the same mixed audio stream (e.g., audio stream a+b) from the audio mixer.

Under a conventional approach, although clients C and D will receive the same mixed audio, they will receive such audio encoded separately. If clients C and D are also using the same audio codec settings, then the audio mixer would encode the same mixed audio twice (e.g., mixed audio a+b sent to each of clients C and D) with essentially the same encoder instance. Such repetitive encoding is a waste of processing resources (e.g., CPU cycles).

Given the shortcomings identified in the above example scenario, rather than separately encoding the same mixed audio content multiple times (e.g., encoding mixed audio stream a+b two times, once for each of the two recipient clients C and D), embodiments of the present disclosure relate to reusing the same mixed audio stream for each client that is to receive it such that the mixed audio stream need only be encoded once. As such, the mixed audio stream would not need to be encoded for each client (e.g., participant, user, individual, or for each "channel" as sometimes referred to herein) to which the stream is sent by the audio mixer. This greatly reduces the amount of processing resources expended on encoding mixed audio, while not comprising audio quality.

The following example is provided to further illustrate the various shortcomings associated with some of the conventional approaches. For purposes of simplicity, this example presents a simplified audio mixer with the following properties. The audio mixer must always mix the audio of N clients if there are N clients connected to the mixer (where "N" is an arbitrary number, but is a number that may not change over time). If n clients are connected to the mixer, where n<N, then n clients should always be mixed. If a client is being mixed (e.g., the client's audio is being mixed by the audio mixer) then that client will receive audio containing the mix of all clients that are being mixed except for his or her own audio (e.g., the client does not want to hear his or her own audio content). Additionally, if a client is not being mixed then that client will receive (e.g., from the audio mixer) audio containing the mix of the N participants selected for mixing.

Furthermore, the following illustration assumes the same example scenario presented above in which clients A, B, C, and D are participating in an audio conference, and where the audio streams sent by clients A, B, C, and D to the audio mixer are represented as a, b, c and d, respectively. For a particular mix cycle, those clients whose audio streams were not included in the mix will receive the same mixed audio stream (e.g., the audio of the client(s) who were included in the mix) from the audio mixer. In this example N=2, and mixing decisions $t_0, t_1, \ldots, t_{10}$ are rendered (where $t_1$ is the next mixing decision after $t_0$ and $t_{10}$ is the ninth decision after $t_1$):

TABLE 1

| | Mixing Decisions | | |
| --- | --- | --- | --- |
| | $t_0$ | $t_1$-$t_9$ | $t_{10}$ |
| To A | c | b | c |
| To B | a + c | a | a + c |
| To C | a | a + b | a |
| To D | a + c | a + b | a + c |

With reference to TABLE 1, which illustrates the audio streams sent to each of the participants following the indicated mix cycle (e.g., mixing decision), the audio streams sent to participants C and D are examined. From mixing decision $t_0$, participant C receives audio stream a and participant D receives audio stream a+c. From mixing decisions $t_1$ through $t_9$, participants C and D each receive audio stream a+b. Lastly, from mixing decision $t_{10}$, participant C receives audio stream a and participant D receives audio stream a+c. Accordingly, from mixing decisions $t_1$-$t_9$, participants C and D are encoding the same audio, while at $t_0$ and $t_{10}$ they are not.

In operation, at least some audio codecs use information about previous encoded audio streams to efficiently encode the current stream. In other words, the state of the encoder and decoder depends on some number of previous audio samples, where the number of samples depend on the codec. For example, PCMU and PCMA are stateless codecs for which the naive solution can be used without encountering any problems (e.g., as long the encoders/decoders are synchronized, which is described in greater detail below).

Referring again to the example illustrated in TABLE 1, if at $t_1$ the audio to be sent to participants C and D (e.g., audio stream a+b) were to be mixed and encoded using, for example, participant C's encoder, then the audio that participant D would hear after decoding its stream is likely to contain what is sometimes referred to as "artifacts." As used herein, artifacts are commonly perceived by a user as a clicking or popping sound; however, other types of artifacts can be expected as well. The artifacts that participant D is likely to perceive in such a scenario are due to the mismatch of participant D's decoder with participant C's encoder.

Continuing with the example presented above, assume that at $t_0$, participant D was using its own encoder, at $t_1$-$t_9$, participant D was reusing the frames from participant C's encoder, and at $t_{10}$, participant D was using its own encoder again. In such a scenario, participant D's encoder will not have been used during $t_1$-$t_9$, which means that its codec state will be based on $t_0$. However, participant D's decoder has been running the whole time based on audio from participant C's encoder. As a result, there is a mismatch in encoder/decoder state in this instance as well, which may also trigger audio artifacts.

Stated one way, the audio artifact problem may be summarized as the difference in codec state when a participant (e.g., participant D) goes from using the participant's own encoder to using a shared encoder (e.g., participant C's encoder, as in the example scenario described above), and when going from the shared encoder back to using the participant's own encoder.

As will be described in greater detail herein, embodiments of the present disclosure provide methods for reusing audio streams such that processing resources (e.g., CPU cycles) are not wasted on encoding the same audio streams multiple times (e.g., more than once), while audio quality is not comprised. The methods described herein are useful in a number of different scenarios. Two example scenarios in which the methods are particularly useful are when a participant transitions from using a shared encoder to using the participant's own encoder, and when the participant transitions from using the participant's own encoder to using a shared encoder.

In a scenario where a participant transitions from using a shared encoder to using the participant's own encoder, according to at least one embodiment, a copy (e.g., an identical copy) is made of the shared encoder state and the copy used to replace the participant's own encoder state. Once the copy of the shared encoder state has replaced the participant's own encoder state, the participant may begin using the participant's own (updated) encoder for future audio samples.

In a scenario where a participant goes from using the participant's own encoder to using a shared encoder, according to one or more embodiments described herein, the participant continues to use the participant's own encoder to encode audio (even though the audio encoded may be the same as the audio that the shared encoder encodes). After some interval of time, which depends on the particular codec, the participant's own encoder and the shared encoder are in very similar states. When the states of the two encoders are similar enough, the participant may stop using the participant's own encoder and may begin reusing the encoded audio from the shared encoder without introducing artifacts.

For example, in at least one embodiment, the states of the two encoders are "similar enough" when encoding and decoding of the stream segment does not result in audible distortions of the original waveform. In at least one other embodiment, the states of the two encoders are "similar enough" when encoding and decoding of the stream segment is identical to that of an encoder-decoder pass where there is no mismatch in codec states. It should be noted that in most scenarios the determination of whether the states of the two encoders are "similar enough" depends on the requirements of the system involved. Additionally, the number of samples that need to be encoded to achieve either of the above examples of what may constitute "similar enough" will be codec dependent (and thus theoretically or empirically determined).

It should be noted that in the example methods described above, for both the scenario where a participant transitions from using a shared encoder to using the participant's own encoder, and also where a participant goes from using the participant's own encoder to using a shared encoder, both the participant's own encoder and the shared encoder are synchronized (e.g., both the codec state and any buffered samples (which can be considered part of the codec state) must be copied at the same time, and both encoders are producing encoded frames that correspond to the same audio samples). In at least one embodiment, synchronization can be achieved by copying the state of the shared encoder (along with the buffered audio) to the participant's own encoder when a new participant is added. For example, if the mixing decision is made every 10 milliseconds (ms), but the size of the encoded frames are blocks of 20 ms audio, the participant's own encoder and the shared encoder may not be out of sync by encoding audio with start points at different mix cycles. Additionally, if a coder encodes two frames before generating encoded data, both frames must be identical if the same encoder is to be used for multiple participants. The same also applies for a new participant to a given conference.

Another implementation or embodiment described herein includes storing a sufficient number of audio frames such that a participant's own encoder can bring the codec state close to that of the shared encoder by encoding audio and throwing away the result. In other words, instead of copying the codec state, the participant's own encoder may be given enough samples to be able to reproduce a similar state to that of the shared encoder.

Figure 1:
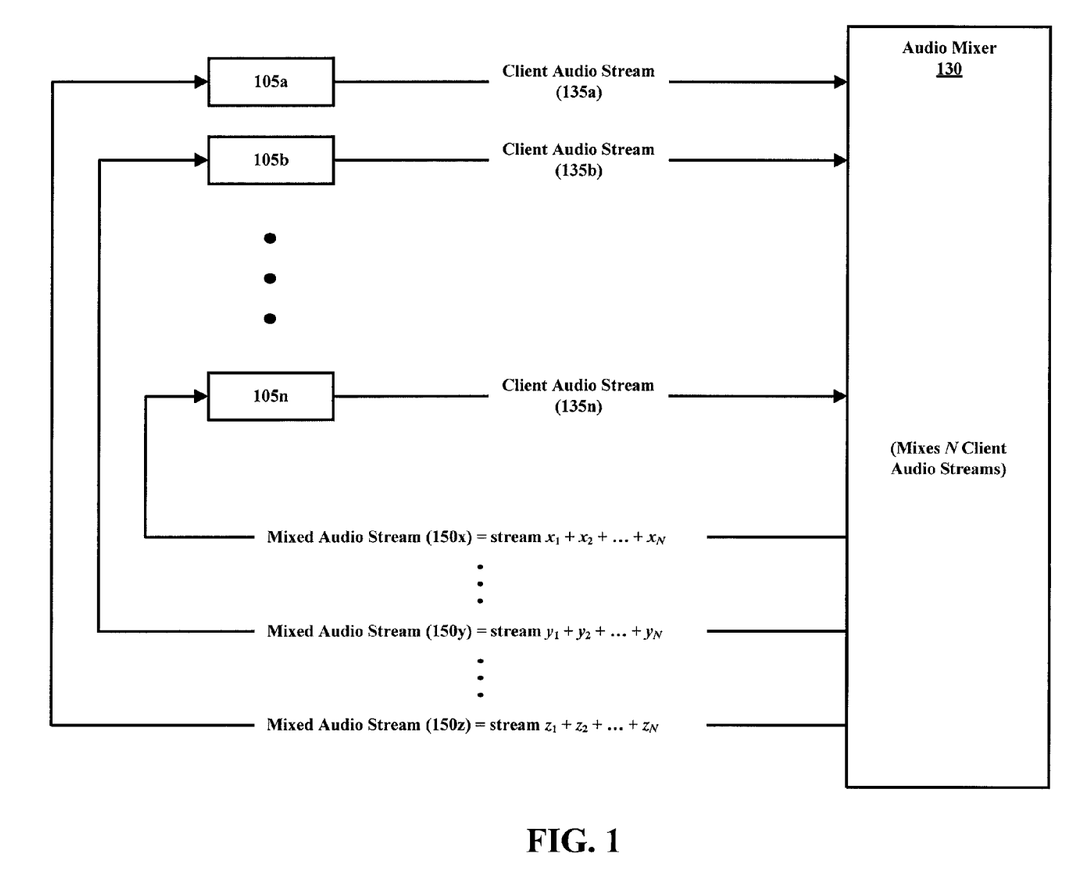
FIG. 1 is a block diagram illustrating a portion of an example audio mixing environment including data flows between one or more clients and an audio mixing apparatus according to one or more embodiments described herein.

FIG. 1 illustrates a portion of an example audio mixing environment in which one or more embodiments described herein may be implemented. For example, the audio mixing environment shown may correspond to a multi-party audio conferencing session in which multiple participants $105a$, $105b$, up through $105n$ (where "n" is an arbitrary number) send their respective client audio streams $135a$, $135b$, and $135n$ to an audio mixer $130$ (which may be part of conferencing hardware or a conferencing system).

The audio mixer $130$ may perform an audio mixing algorithm using the received client audio streams $135a$, $135b$, and $135n$. In accordance with at least one embodiment, the audio mixer $130$ may mix N of the received client audio streams $135a$, $135b$, and $135n$ (where "N" is an arbitrary number less than "n"). The audio mixer $130$ may then send mixed audio streams $150x$, $150y$, and $150z$ (where "x", "y", and "z" are arbitrary numbers) to the clients $105a$, $105b$, up through $105n$, where mixed audio stream $150x$ represents stream $x_1+x_2+\ldots+x_N$ (where $x_i \neq x_j$ for all i,j where i≠j), mixed audio stream $150y$ represents stream $y_1+y_2+\ldots+y_N$ (where $y_i \neq y_j$ for all i,j where i≠j), and mixed audio stream $150z$ represents stream $z_1+z_2+\ldots+z_N$ (where $z_i \neq z_j$ for all i,j where i≠j). In an example scenario, following the audio mixer $130$ performing an audio mixing algorithm on the received client audio streams $135a$, $135b$, and $135n$, the audio mixer $130$ may send mixed audio stream $150z$ to client $105a$, mixed audio stream $150y$ to client $105b$, and mixed audio stream $150x$ to client $105n$. It should be understood that while the present example shows three mixed audio streams (e.g., 150x, 150y, and 150z) being sent from the audio mixer 130 to the clients (e.g., 105a, 105b, up through 105n), the scope of the present disclosure is not in any way intended to be limited to such. Rather, depending on the particular scenario (e.g., the number of clients participating in the audio conference) there may be more than three mixed audio streams returned to the clients by the audio mixer 130.

Figure 2:
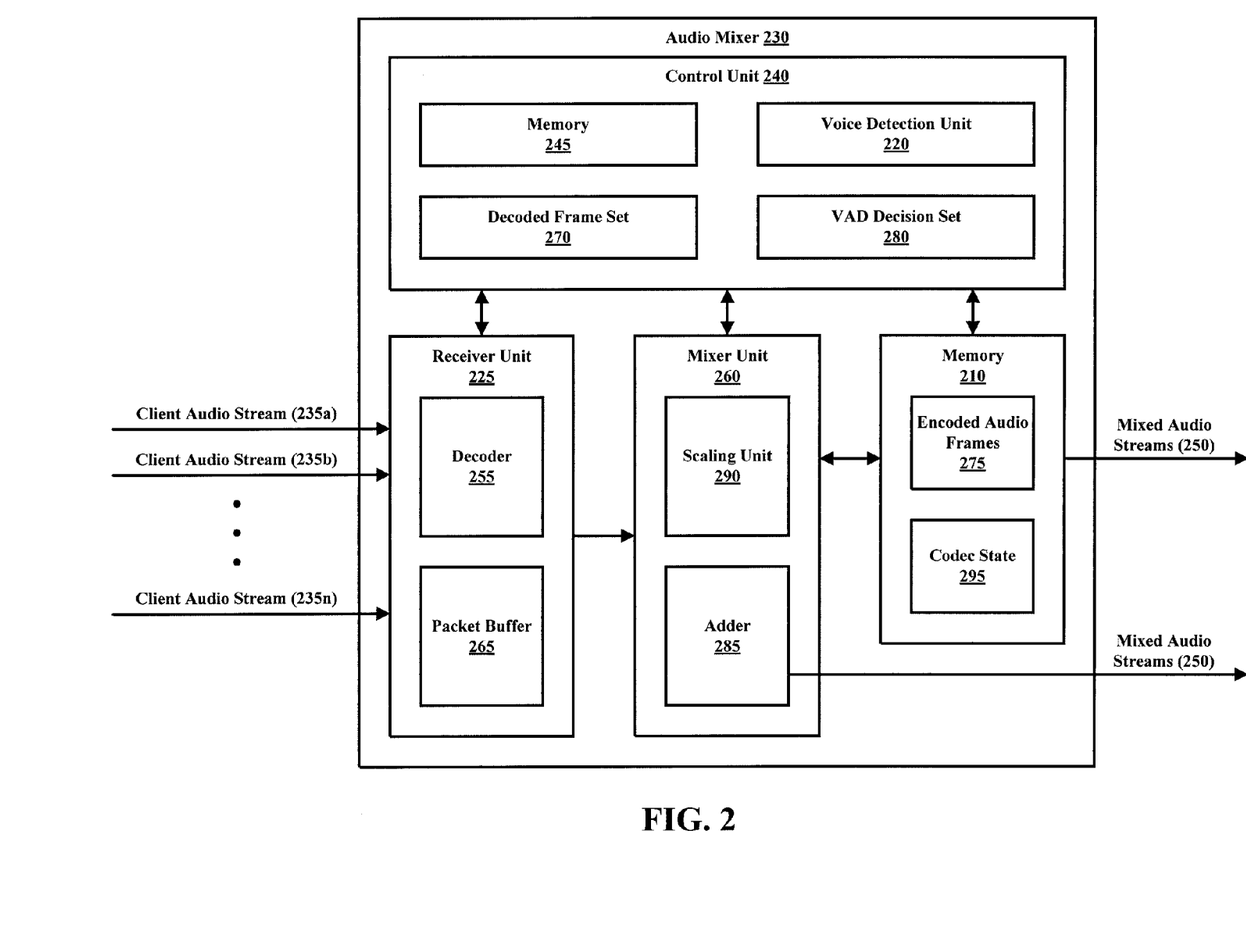
FIG. 2 is a block diagram illustrating an example audio mixing apparatus along with incoming and outgoing data flows according to one or more embodiments described herein.

FIG. 2 illustrates an example audio mixing apparatus along with incoming and outgoing data flows according to one or more embodiments described herein. In at least one embodiment, the audio mixing apparatus 230 (sometimes referred to herein as an audio mixer or simply a mixer for purposes of brevity) may include a control unit 240, a receiver unit 225, a mixer unit 260, and a memory component 210.

The control unit 240 may be comprised of memory 245, voice detection unit 220, decoded frame set 270 and voice activity detection (VAD) decision set 280. The receiver unit 225 may include components such as decoder 225 and packet buffer 265, while the mixer unit 260 may include scaling unit 290 and adder unit 285.

The audio mixer 230 may be configured to receive a plurality of client audio streams 235a, 235b, up through 235n (which may correspond to client audio streams 135a, 135b, and 135n, respectively as shown in the example environment of FIG. 1). The client audio streams 235a, 235b, up through 235n may be received at the receiver unit 225, where the audio packets are placed in the packet buffer 265 before being decoded by the decoder 255.

The mixer unit 260 may be configured to perform an audio mixing algorithm based on the voice activity detection 220 from the control unit 240. The adder 285 may combine the client audio streams to be mixed (e.g., one or more of client audio streams 235a, 235b, up through 235n) to form one or more mixed audio streams 250, which may then be sent back to the clients (e.g., clients 105a, 105b, up through 105n as shown in FIG. 1). The memory component 210 may be configured to store encoded audio frames 275 and copy the codec state 295 (e.g., following a mix cycle performed by the mixer unit 260). In addition to the mixer unit 260 generating mixed audio streams 250, one or more mixed audio streams 250 may also be generated from the memory component 210 (e.g., based on the stored encoded audio frames 260).

Figure 3:
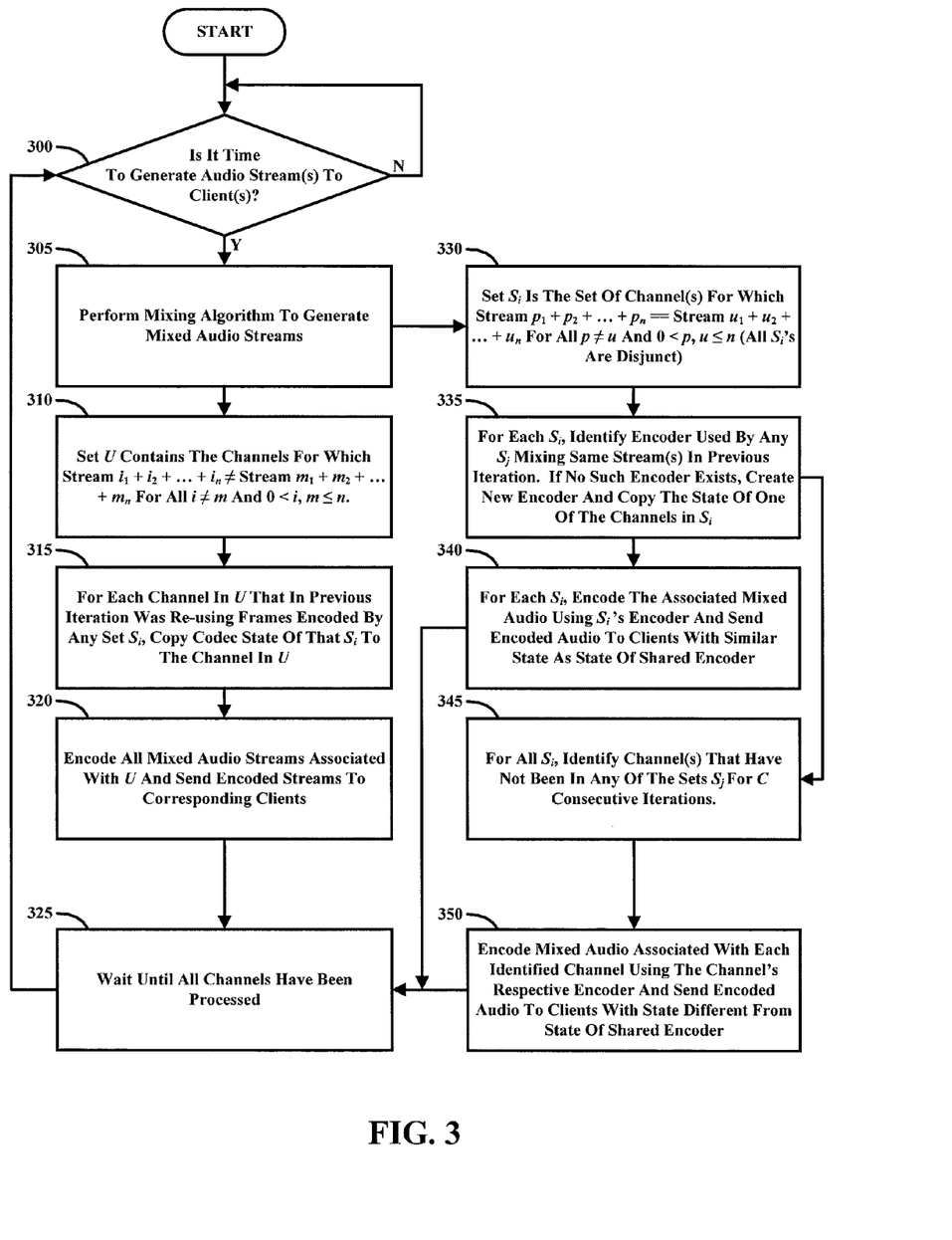
FIG. 3 is a flowchart illustrating an example method for reusing encoded audio from a shared encoder according to one or more embodiments described herein.

FIG. 3 illustrates an example process for reusing encoded audio from a shared encoder according to one or more embodiments described herein.

The process may begin at block 300 where a determination is made as to whether it is time to generate audio streams (e.g., mixed audio streams) to clients. For example, the determination made at block 300 may be made by an audio mixing apparatus (e.g., audio mixer 130 or 230 as shown in the examples of FIGS. 1 and 2) that is part of conferencing hardware or a conferencing system being used by multiple participants in an audio conferencing session. If it is determined at block 300 that it is not yet time to generate audio streams to clients, the process may return to the start and repeat block 300 again. On the other hand, if it is determined at block 300 that it is time to generate audio streams to clients, the process may instead move to block 305 where a mixing algorithm may be performed to generate one or more mixed audio streams.

Following the mixing algorithm at block 305, the channels may be grouped into two channel sets, as represented by the process moving from block 305 to both of blocks 310 and 330. For example, following the mixing algorithm at block 305, the channels may be grouped based on whether or not the same mixed audio stream may be used for that channel (e.g., based on whether the channel is to receive a unique or non-unique mixed audio stream). At block 310, the channels which are receiving unique client streams may be grouped into channel set "U". In accordance with at least one embodiment, channel set U may contain the channels for which audio stream $i_1 + i_2 + \ldots + i_n \neq$ audio steam $m_1 + m_2 + \ldots + m_n$ for all $i \neq m$ and $0 < i$, $m \leq n$.

At block 330, the channels which may all be receiving the same (e.g., non-unique) mixed audio stream may be grouped into channel set(s) "$S_i$". For example, each channel set $S_i$ may include the channels for which audio stream $p_1 + p_2 + \ldots + p_n =$ audio steam $u_1 + u_2 + \ldots + u_n$ for all $p \neq u$ and $0 < p$, $u \leq n$. It should be noted that the channel sets $S_i$ should be generated so that all $S_i$ are disjunct (e.g., the channel sets $S_i$ should not contain the same mixed audio streams). For example, if clients A, B, C, and D are supposed to hear the same audio, there is no reason to create two sets of $S_i$ (e.g., one set with A and B, and a second set with C and D). Instead, one channel set $S_i$ should be created with A, B, C, and D.

From block 310 the process may move to block 315 where for each channel in channel set U that, in the previous iteration of the process was re-using frames encoded by any channel set $S_i$ the codec state of that set $S_i$ may be copied to the channel in channel set U. From block 315, the process may continue to block 320 where the mixed audio streams associated with channel set U may be encoded and sent to the corresponding clients (e.g., one or more of clients 105a, 105b, up through 105n as shown in the example environment of FIG. 1).

From block 330, where the channels that may all be receiving the same audio stream may be grouped into channel set(s) $S_i$ the process may move to block 335. At block 335, for each channel set $S_i$, the encoder used by any $S_j$ that was mixing the same stream(s) in the previous iteration of the process may be identified. In accordance with at least one embodiment, if no such encoder exists, a new encoder may be created and the state of one of the channels in $S_i$ may be copied.

The process may continue from block 335 to blocks 340 and/or 345. At block 340, for each of the channel sets $S_i$, the associated mixed audio may be encoded using that channel set $S_i$'s encoder, and the encoded audio may then be sent to the corresponding clients that have an encoder state similar to that of the shared encoder. It should be noted that block 315, which is described in detail above, should be completed before the process moves to block 340 since block 340 will change the encoder's state beyond what the decoder associated with block 315 expects. The process may also move from block 335 to block 345 where, for all of the channel sets $S_i$, the channels that have not been in any of the sets $S_i$ for C consecutive iterations may be identified. In at least one embodiment, the identification of the channels at block 345 may be performed as follows.

Let the metric $M_t(c_1, c_2) \sim 0$ if applying $c_1$'s encoder and $c_2$'s decoder (or vice versa) is nearly, or in some instances completely, indistinguishable from applying $c_1$'s or $c_2$'s encoder/decoder set. The audio for which $M_t(c_1, c_2)$ may be evaluated is all possible audio, or a realistic subset of all possible audio. In the following, C is a number of iterations (integer value) for which $M_{t1+c}(c_1, c_2) \sim 0$ if $c_1$ and $c_2$ are fed with the same audio from $t_1$ until $t_1+C$. Accordingly, C may be approximated by applying the solution on a set of files (e.g., a training vector or a limited subset of all audio, similar to prerecorded files), where the value may be incremented from 0 until $M_{t1+c}(c_1, c_2) \sim 0$ for that audio. If at some point in time, a portion of audio is discovered for which $M_{t1+c}(c_1, c_2)! \sim 0$, C may be increased until $M_{t1+c}(c_1, c_2) \sim 0$ is fulfilled for that portion of audio. It should be noted that values of C that fulfill the above condition ($M_{t1+c}(c_1, c_2) \sim 0$) may vary between codecs that converge differently.

The process may move from block 345 to block 350, where the mixed audio associated with each channel identified at block 345 may be encoded using that channel's respective encoder. This encoded mixed audio may then be sent to the respective individual clients with an encoder state that is different from that of the shared encoder (e.g., whereas the mixed audio streams from block 340 are sent only to those clients that have an encoder state that is similar to that of the shared encoder).

Figure 4:
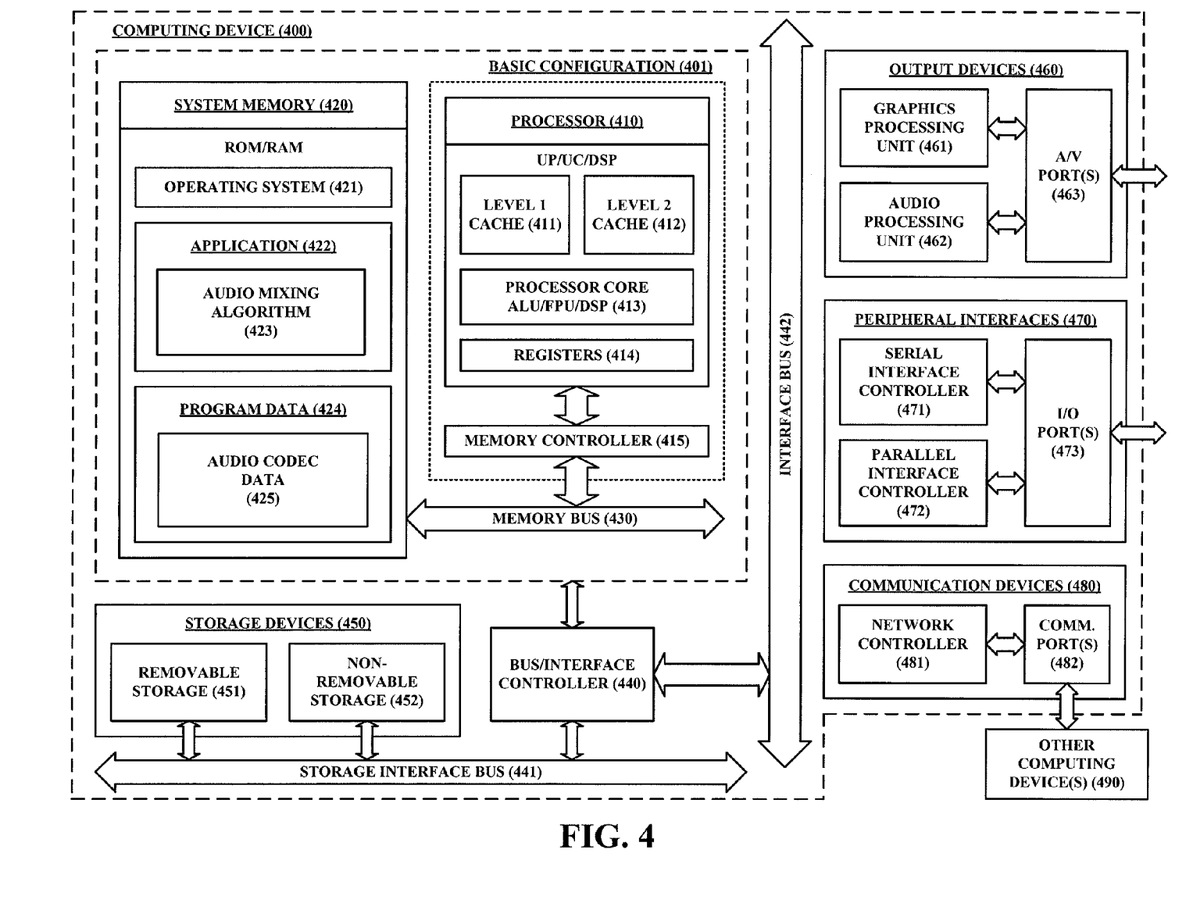
FIG. 4 is a block diagram illustrating an example computing device arranged for reusing encoded audio from a shared encoder in an audio mixing arrangement according to one or more embodiments described herein.

FIG. 4 is a block diagram illustrating an example computing device 400 that is arranged for reusing encoded audio streams from a shared encoder in accordance with one or more embodiments described herein. As described above, encoded audio streams may be reused for participants in, for example, an audio conference such that processing resources (e.g., CPU cycles) are not wasted on encoding the same audio streams multiple times (e.g., more than once). In a very basic configuration 401, computing device 400 typically includes one or more processors 410 and system memory 420. A memory bus 430 may be used for communicating between the processor 410 and the system memory 420.

Depending on the desired configuration, processor 410 can be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 can also be used with the processor 410, or in some embodiments the memory controller 415 can be an internal part of the processor 410.

Depending on the desired configuration, the system memory 420 can be of any type including but not limited to volatile memory (e.g., RAM), non-volatile memory (e.g., ROM, flash memory, etc.) or any combination thereof. System memory 420 typically includes an operating system 421, one or more applications 422, and program data 424. In at least some embodiments, application 422 includes an audio mixing algorithm 423 that is configured to reuse audio streams for one or more participants in an audio mixing application based on a determination that a given participant transitions from using a shared encoder to using the participant's own encoder, and/or that a participant transitions from using the participant's own encoder to using a shared encoder. For example, in a scenario where a participant transitions from using a shared encoder to using the participant's own encoder, the audio mixing algorithm 423 may be configured to generate a copy (e.g., an identical copy) of the shared encoder state and use the copy to replace the participant's own encoder state. As described above, once the copy of the shared encoder state has replaced the participant's own encoder state, the participant may begin using the participant's own (updated) encoder for future audio samples.

Program Data 424 may include audio codec data 425 that is useful for determining whether a given participant transitions from using a shared encoder to using the participant's own encoder, and also whether a participant transitions from using the participant's own encoder to using a shared encoder. In some embodiments, application 422 can be arranged to operate with program data 424 on an operating system 421 such that the audio mixing algorithm 423 may use the audio codec data 425 to determine whether mixed audio should be reused for a particular participant in, for example, an audio conference application.

Computing device 400 can have additional features and/or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of computing device 400.

Computing device 400 can also include an interface bus 442 for facilitating communication from various interface devices (e.g., output interfaces, peripheral interfaces, communication interfaces, etc.) to the basic configuration 401 via the bus/interface controller 440. Example output devices 460 include a graphics processing unit 461 and an audio processing unit 462, either or both of which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473.

An example communication device 480 includes a network controller 481, which can be arranged to facilitate communications with one or more other computing devices 490 over a network communication (not shown) via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for sharing encoded audio, the method comprising:
   encoding, by an audio mixing apparatus, audio signals to send to a first client using a first encoder and audio signals to send to a second client using a second encoder;
   determining that there is an absence of audible distortions resulting from the encoding of the audio signals to send to the first client using the first encoder and the encoding of the audio signals to send to the second client using the second encoder; and
   responsive to the determination of the absence of audible distortions, sending the audio signals encoded using the second encoder to both the first client and the second client, wherein the audio signals encoded using the second encoder are sent to the first client in place of the audio signals encoded using the first encoder.

2. The method of claim 1, further comprising:
   receiving, at the audio mixing apparatus, audio signals from a plurality of clients in communication with the audio mixing apparatus;
   performing a mixing algorithm on the received audio signals to generate a plurality of mixed audio signals; and sending each of the plurality of mixed audio signals to one or more of the plurality of clients.

3. The method of claim 2, wherein the mixing algorithm is performed based on voice activity detected in the received audio signals.

4. The method of claim 1, further comprising:
buffering audio frames to send to the first client until an encoder state of the first encoder is similar to an encoder state of the second encoder; and
responsive to determining that the encoder state of the first encoder is similar to the encoder state of the second encoder, sending the audio signals encoded using the second encoder to both the first client and the second client, wherein the audio signals encoded using the second encoder are sent to the first client in place of the audio signals encoded using the first encoder.

5. The method of claim 1, wherein determining that the first encoder and the second encoder are in similar encoder states includes determining that the first encoder and the second encoder are both producing encoded audio frames that correspond to the same audio samples.

6. The method of claim 1, further comprising:
storing audio frames of the audio signals to send to the first client;
determining that the stored audio frames of the audio signals to send to the first client correspond to audio frames of the audio signals to send to the second client; and
reproducing an encoder state of the second encoder for use by the first encoder.

7. The method of claim 1, wherein the first encoder and the second encoder are synchronized with respect to buffered audio.

8. A system for sharing encoded audio, the system comprising:
at least one processor; and
a non-transitory computer-readable medium coupled to the at least one processor having instructions stored thereon that, when executed by the at least one processor, causes the at least one processor to:
encode audio signals to send to a first client using a first encoder and encode audio signals to send to a second client using a second encoder;
determine that there is an absence of audible distortions resulting from the encoding of the audio signals to send to the first client using the first encoder and the encoding of the audio signals to send to the second client using the second encoder; and
responsive to the determination of the absence of audible distortions, send the audio signals encoded using the second encoder to both the first client and the second client, wherein the audio signals encoded using the second encoder are sent to the first client in place of the audio signals encoded using the first encoder.

9. The system of claim 8, wherein the at least one processor is further caused to:
receive audio signals from a plurality of clients in communication with each other over a network;
perform a mixing algorithm on the received audio signals to generate a plurality of mixed audio signals; and
send each of the plurality of mixed audio signals to one or more of the plurality of clients.

10. The system of claim 9, wherein the mixing algorithm is performed based on voice activity detected in the received audio signals.

11. The system of claim 8, wherein the at least one processor is further caused to:
buffer audio frames to send to the first client until an encoder state of the first encoder is similar to an encoder state of the second encoder; and
responsive to determining that the encoder state of the first encoder is similar to the encoder state of the second encoder, send the audio signals encoded using the second encoder to both the first client and the second client, wherein the audio signals encoded using the second encoder are sent to the first client in place of the audio signals encoded using the first encode.

12. The system of claim 8, wherein the at least one processor is further caused to:
determine that the first encoder and the second encoder are both producing encoded audio frames that correspond to the same audio samples.

13. The system of claim 8, wherein the at least one processor is further caused to:
store audio frames of the audio signals to send to the first client;
determine that the stored audio frames of the audio signals to send to the first client correspond to audio frames of the audio signals to send to the second client; and
reproduce an encoder state of the second encoder for use by the first encoder.

14. The system of claim 8, wherein the first encoder and the second encoder are synchronized with respect to buffered audio.

* * * * *